No. 852,528. PATENTED MAY 7, 1907.
C. SCHERF.
PAWL PRESS.
APPLICATION FILED JAN. 5, 1907.

Witnesses:
L. H. Staaden.
E. S. Sargent.

Inventor.
Carl Scherf
by Alfred Müller
Atty.

UNITED STATES PATENT OFFICE.

CARL SCHERF, OF SAARBURG, GERMANY.

PAWL-PRESS.

No. 852,528.   Specification of Letters Patent.   Patented May 7, 1907.

Application filed January 5, 1907. Serial No. 350,915.

*To all whom it may concern:*

Be it known that I, CARL SCHERF, electrician, a subject of the King of Saxony, residing at Saarburg, District Trier, in the Kingdom of Prussia and German Empire, have invented new and useful Improvements in Pawl-Presses, of which the following is a specification.

The subject of my invention is a pawl press having two screw spindles with respectively right- and left- hand threads, the nuts of which, operated by a system of levers, act upon a cross head or bridge carrying the follower.

The essential feature of the new press is that the nuts are turned alternately instead of simultaneously, so that the cross head and follower act as a single armed lever. In this manner, for each turn of the lever-system only half as much power is necessary as with prior apparatus, in which the nuts are turned simultaneously.

Figure 1:
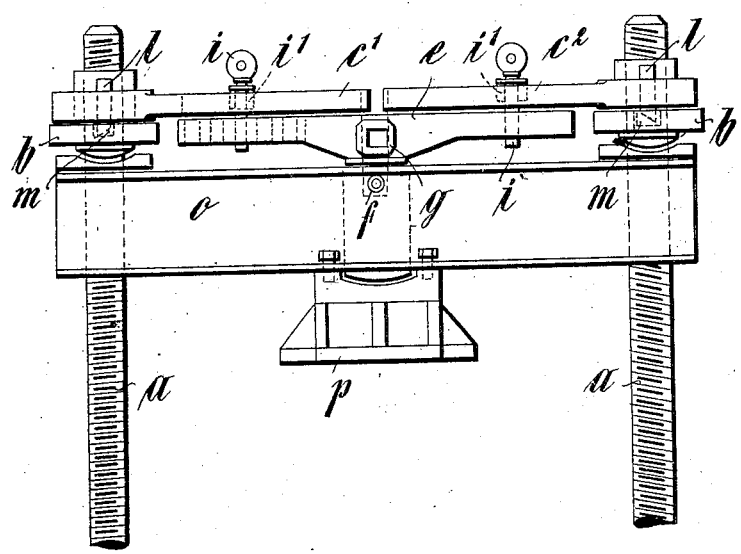
Figure 2:
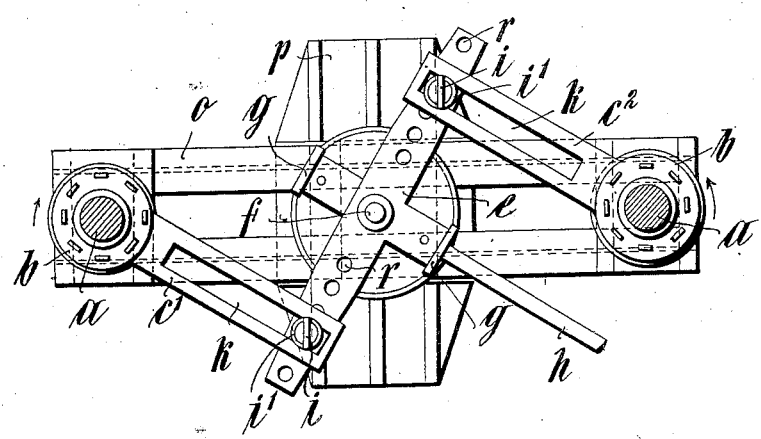

One form of construction of the new press is illustrated in the accompanying drawing, in which Figure 1 is a side elevation, and Fig. 2 a plan.

On the screw spindles $a$, one of which has a right and the other left-hand thread, nuts $b$ are provided, which are actuated in the usual manner each by a feed lever $c'$ $c^2$, respectively, with drop-pawls $l$. In the middle, between the spindles $a$, is mounted a double-armed lever $e$, turning on a pin $f$. This lever $e$ is provided with sockets $g$ into which levers $h$ are inserted to enable actuation of the lever $e$. The latter is connected with the feed levers $c'$ $c^2$ by pins $i$. These pins are furnished with rollers $i'$ at the top, engaging in slots $k$ in the feed levers. The tail of each of the bolts $i$, can be inserted into one of the holes $r$. Depending upon whether the pins $i$ are inserted into the holes $r$ toward the ends, or nearer the middle, of the arms of the lever $e$, the power necessary to feed forward the nuts will be less or more, respectively. The connection between the nuts $b$ and feed levers $c'$ $c^2$ is effected by the pawls $l$, which slide vertically in the feed levers and engage in corresponding tooth-shaped recesses $m$ in the nuts $b$. At their bottom ends the pawls $l$ are chamfered. On rotation of the levers $c'$ $c^2$ in one direction the nuts $b$ are turned round; on rotation of these levers $c'$ $c^2$ in the opposite direction, on the other hand, the pawls rise, owing to their lower end being chamfered, and without turning the nuts $b$ leave one recess $m$ and drop into the next.

The chamfered pawls $l$ are so disposed that when the lever-system is set in operation for the purpose of pressing, the nuts $b$ are turned alternately, the one being actuated while the other is left unoperated by the corresponding pawl $l$. The nuts $b$ thus act in turns upon the cross-head $o$, which consists of girders, and which again transmits the power to the follower $p$, located at the center. Owing to the alternate feed of the nuts $b$, which amount to at most 1—2 mms., the head $o$ acts as a single armed lever. The force which has to be exerted on the lever $h$ is, therefore, only half of that which would be requisite were nuts both turned simultaneously.

The rotation of the various parts, necessary owing to the one sided motion of the cross-head and follower, is enabled by the provision of rounded pressing-surfaces.

Instead of the nuts $b$ being turned by pin-pawls, the rotation may be effected by ordinary ratchet pawls engaging suitable teeth provided on the top of the nut.

What I do claim as my invention and desire to secure by Letters Patent, is:—

A pawl press comprising two screw spindles, having respectively right and left hand threads, a nut on each spindle, a cross head guided by the said spindles, a follower on said cross head, a double-armed lever pivoted at the center of said cross-head, a lever jointed to each arm of said double-armed lever, and pawls at the free ends of said levers adapted to engage the nuts on the screw spindles so as to alternately screw said nuts down.

In testimony whereof I have signed my name to this specification in the presence of two subscribing witnesses.

CARL SCHERF.

Witnesses:
 ALBERT FISCHER,
 ADOLF CHEVALIER.